No. 878,987. PATENTED FEB. 11, 1908.
J. W. McEACHERN.
TRAP.
APPLICATION FILED JULY 5, 1907.
2 SHEETS—SHEET 1.
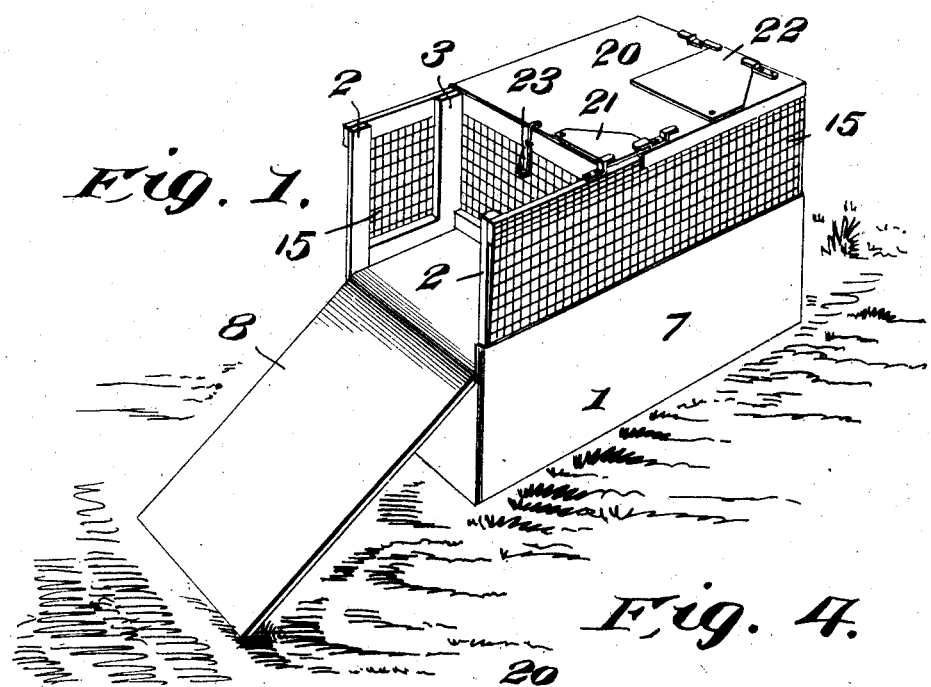
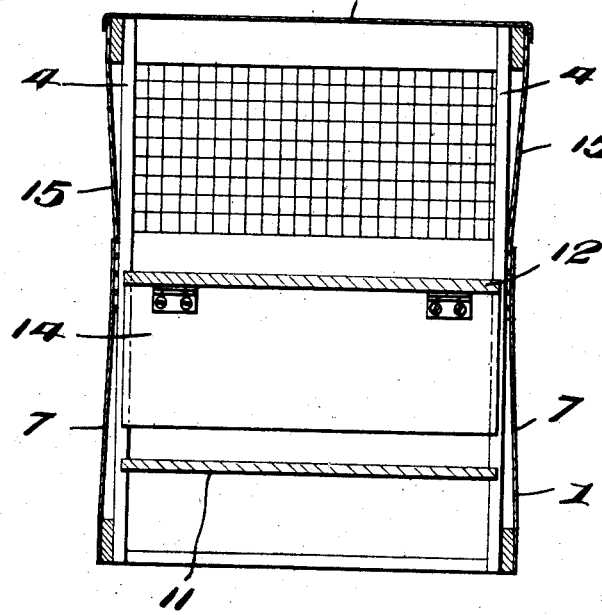
Witnesses
Inventor
J. W. McEachern
By W. J. Fitzgerald & Co.
Attorneys

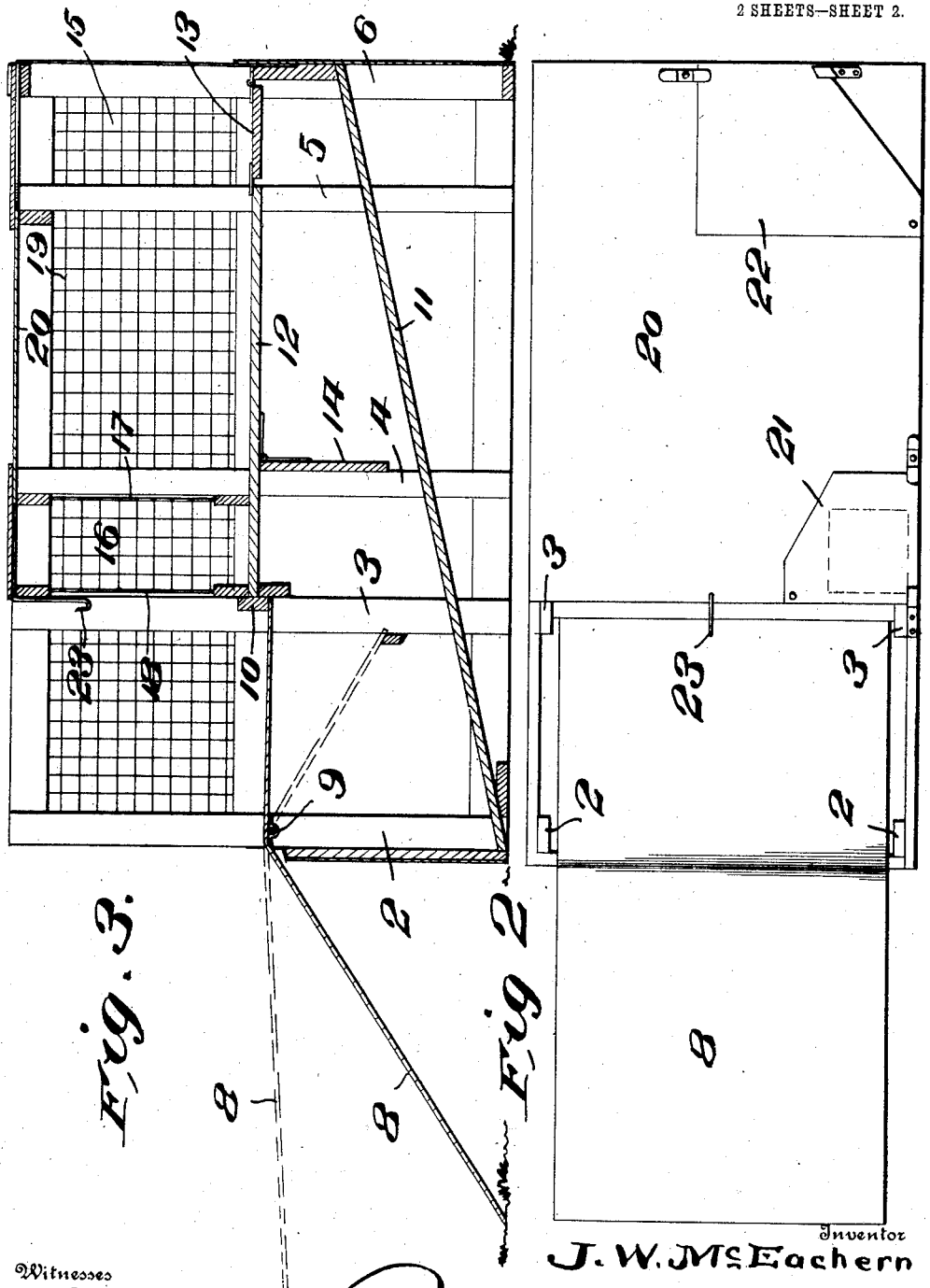

UNITED STATES PATENT OFFICE.

JOHN WALTER McEACHERN, OF EULA, TEXAS.

TRAP.

No. 878,987.

Specification of Letters Patent.

Patented Feb. 11, 1908.

Application filed July 5, 1907. Serial No. 382,308.

*To all whom it may concern:*

Be it known that I, JOHN WALTER MC-EACHERN, a citizen of the United States, residing at Eula, in the county of Callahan and State of Texas, have invented certain new and useful Improvements in Traps; and I do hereby declare the following to be a full, clear, and exact description of the invention, such as will enable others skilled in the art to which it appertains to make and use the same.

My invention relates to new and useful improvements in traps, and more particularly to that class adapted to be used in trapping smaller animals or birds, and my object is to provide means for directing the animals into the trap when the animals attempt to reach the bait.

A further object is to provide means for securing the bait on the trap and a still further object is to provide run-ways in the trap for the better imprisonment of the animals.

Other objects and advantages will be hereinafter referred to and more particularly pointed out in the claims.
In the accompanying drawings which are made a part of this application, Figure 1 is a perspective view of the trap complete and ready for use. Fig. 2 is a top plan view thereof. Fig. 3 is a longitudinal sectional view through the trap showing the tilting platform in its operative position by dotted lines, and, Fig. 4 is a transverse vertical sectional view through the trap.

Referring to the drawings in which similar reference numerals designate corresponding parts throughout the several views, 1 indicates the frame of my improved trap which preferably consists of a plurality of uprights, 2, 3, 4, 5 and 6, said uprights being arranged in pairs and surrounded at their lower ends by a wall 7, which preferably consists of sheet metal or the like.

Pivotally mounted between the pairs of uprights 2 is a pivot point 9 to the free end of the platform, being at an angle to the inner end of the platform, so that when the platform is in its normal position, the free end of the inclined portion thereof will rest upon the ground or other suitable support, while the inner end of the platform, or that portion extending to the opposite side of the pivot point will be in a horizontal position and the extreme inner end thereof engaging the lower edge of a beam 10, said beam being employed to limit the movement of the platform in one direction.

The inner end of the platform 8 extends from the uprights 2 to the uprights 3, while the inclined end thereof extends a distance from the forward end of the trap, thereby providing more weight at the inclined end of the platform than at the opposite end, so that the inner end of the platform will be normally held in a horizontal position and against the lower edge of the beam 10.

The animal, in approaching the trap, travels up the inclined portion of the platform 8 and onto the horizontal portion thereof, and the platform is so balanced that as soon as the animal has reached the horizontal portion of the platform, that end of the platform will descend and the inclined end thereof ascend, which will result in pitching the animal forward and into that portion of the trap surrounded by the wall 7, and as soon as the weight of the animal is removed from the inner end of the platform, the platform will swing upon its pivot point and return to its initial position, thereby imprisoning the animal in the trap.

The animal, in descending from the platform 8 is deposited upon an inclined floor section 11, which extends rearwardly and upwardly from the lower end of the uprights 2 to the uprights 6, and above the floor section 11, I provide an auxiliary floor section 12, which is preferably horizontal and extends from the uprights 3 to the uprights 5, the floors 11 and 12 forming a run-way, which decreases in size towards the rear end of the trap and as the first inclination of the animal, when entering the run-way is to attempt to escape, it naturally travels up the inclined floor section 11 so that the animal is brought into contact with the auxiliary floor section when it has reached the rear end of the trap and in order to allow the animal to escape into the upper portion of the trap, I provide a door 13, which is hingedly secured between the uprights 6 and extends into engagement with the rear end of the auxiliary floor 12 when the door is closed, but will readily yield and be elevated by the animal pushing against the lower side thereof, and will immediately descend as soon as the animal has passed into the upper portion of the trap and in this manner the animal is prevented from returning into the run-way after it has once entered the upper portion of the trap.

In order to prevent the animal from returning to the lower end of the floor section 11, I hingedly secure to the bottom of the auxiliary floor section 12 a door 14, which extends laterally across the trap and abuts against the rear edge of the uprights 4 thereby limiting the forward movement of the door but leaving the same free to move in the opposite direction and the lower edge of the door is extended a distance above the floor section 11, so that a small space will be left between the door and floor section, which will entice the animal to attempt to pass below the door, but it will be understood that the door will freely swing open when engaged by the animal and will allow the animal to move towards the rear end of the trap, but will immediately descend as soon as the animal has moved beyond the door. In this manner the space below the horizontal portion of the platform 8 is kept clear so that the next animal stepping upon the inner end of the platform will be deposited on the floor section 11. The upper ends of the uprights are provided with a covering of woven wire, or the like, 15 which extends along both sides of the trap and across the rear end thereof, the space between the uprights 2 being left free of the wire, so that the animals can readily pass onto the inner end of the tilting platform, and between the uprights 3 and 4 is located a compartment 16, which is formed by extending woven wire laterally across the trap to form partitions 17 and 18, the partition 18 limiting the rearward travel of the animal, while the partition 17 forms one end wall of a compartment 19 formed above the auxiliary floor 12 into which the animals pass from the run-way.

The compartments 16 and 19 are provided with a cover 20, which is preferably of sheet metal and is provided with removable sections 21 and 22 over the compartments 16 and 19 respectively, so that access may be had to the compartments.

The object of the compartment 16 is to provide a place for depositing bait, such as grain, or the like, employed for attracting the birds to the trap or solid substances may also be deposited therein for attracting the animals. In addition to the compartment 16, a hook 23 is secured to the front face of the compartment 16, so that solid bait, such as meat, or the like, may be secured thereon to attract the animals.

It will thus be seen that I have provided a very cheap and economical form of trap for catching various kinds of animals and birds and one that will hold a number of the animals at one and the same time. It will further be seen that by providing the inclined floor the animals in attempting to escape will move from under the tilting platform and into the upper compartment, and by providing the swinging doors, as shown, the animals are prevented from returning to that portion of the run-way below the tilting platform.

What I claim is:

1. A trap of the class described, comprising a plurality of uprights, a wall surrounding the lower portion of said uprights, a platform pivotally mounted between said uprights adjacent the upper edge of said wall, a portion of said platform being inclined, an inclined floor section in the lower portion of the trap, an auxiliary floor section above said inclined floor section, a screen surrounding the uprights above the auxiliary floor section to form a compartment and a swinging closure between said inclined and auxiliary floor sections and at the rear end of the auxiliary section.

2. A trap of the class described, comprising a plurality of uprights, a wall surrounding the lower ends of said uprights, a platform pivotally mounted between two of said uprights, the outer end of said platform being inclined, an inclined floor section between the lower ends of said uprights, and extending from the front to the rear end of the trap, an auxiliary floor section above said inclined floor section, a swinging door at the rear end of said auxiliary section, screen wire surrounding the upper ends of the uprights, a partition in the upper portion of the trap forming compartments, one of which is employed as a bait compartment, a cover for said compartments and movable sections on said cover, whereby access may be had to the compartments.

3. A trap of the class described, comprising a plurality of uprights, a wall surrounding the lower ends of said uprights and screen wire at the upper ends of said uprights, a platform pivotally mounted between the uprights at the forward end of said trap, one end of said platform being inclined and extended forwardly from the trap, said platform being adapted to tilt when weight is placed on the inner end thereof, an inclined floor section in the lower end of said trap, an auxiliary floor section above said inclined floor section, a vertically disposed door hingedly secured to the lower face of said auxiliary floor section, a horizontally disposed door at the rear end of said auxiliary floor, a screen wire forming compartments above said auxiliary floor, one of which is adapted to receive bait, a cover for said compartments, movable sections on said cover, and a hook extending over the inner end of said platform.

In testimony whereof I have signed my name to this specification in the presence of two subscribing witnesses.

JOHN WALTER McEACHERN.

Witnesses:
J. T. BARNETT,
W. H. MONK.